(12) United States Patent
Crees et al.

(10) Patent No.: US 7,985,369 B2
(45) Date of Patent: Jul. 26, 2011

(54) DOWNDRAFT EXHAUST CUTTING AND SHUTTLE TABLE MECHANISM

(75) Inventors: Craig A. Crees, Hinton, IA (US); Michael J. Jordan, Sioux City, IA (US); Larry L. Minter, Jefferson, SD (US)

(73) Assignee: Owen Industries, Inc., Omaha, NE (US)

( * ) Notice: Subject to any disclaimer, the term of this patent is extended or adjusted under 35 U.S.C. 154(b) by 683 days.

(21) Appl. No.: 12/075,962

(22) Filed: Mar. 14, 2008

(65) Prior Publication Data
US 2009/0233536 A1 Sep. 17, 2009

(51) Int. Cl.
*F24F 7/00* (2006.01)
(52) U.S. Cl. ............................................. 266/49; 266/48
(58) Field of Classification Search .................... 266/48, 266/49
See application file for complete search history.

(56) References Cited

U.S. PATENT DOCUMENTS

| | | | |
|---|---|---|---|
| 3,526,395 A | 9/1970 | Brown | |
| 3,610,603 A | 10/1971 | Schmitz | |
| 3,666,249 A | 5/1972 | MacLeod et al. | |
| 3,701,514 A | 10/1972 | Walters et al. | |
| 3,736,615 A | 6/1973 | Kumaki | |
| 3,770,110 A | 11/1973 | Boskovitch | |
| 3,784,176 A | 1/1974 | Walters et al. | |
| 3,792,846 A | 2/1974 | Geffert | |
| 3,850,086 A | 11/1974 | Walters et al. | |
| 3,999,744 A | 12/1976 | Kotch | |
| 4,058,299 A | 11/1977 | Lindkvist | |
| 4,220,318 A | 9/1980 | Anderson et al. | |
| 4,390,167 A | 6/1983 | Ito et al. | |
| 4,441,934 A | 4/1984 | Kawakami | |
| 4,453,702 A | 6/1984 | Anderson et al. | |
| 4,615,510 A | 10/1986 | Lehmler et al. | |
| 4,887,797 A | 12/1989 | Karow | |
| 4,930,756 A | 6/1990 | Brenneke | |
| 5,435,525 A | 7/1995 | Roy et al. | |
| 6,039,915 A | 3/2000 | Minter et al. | |
| 6,165,410 A | 12/2000 | Crees et al. | |
| 6,320,153 B1 | 11/2001 | Hulings et al. | |
| 6,437,286 B1 | 8/2002 | Scott | |

(Continued)

OTHER PUBLICATIONS

U.S. Appl. No. 11/166,799, filed Jun. 24, 2006 Sunderman, John R., et al.

(Continued)

*Primary Examiner* — Scott Kastler
(74) *Attorney, Agent, or Firm* — Stinson Morrison Hecker LLP

(57) ABSTRACT

A downdraft exhaust cutting and shuttle table mechanism includes a cutting area and a loading area, which includes first and second elongated, horizontally disposed cutting tables which are shuttled into and out of a cutting area which includes a material cutting assembly positioned therein, the shuttle table mechanism including horizontal and vertical table movement devices which are operative to move the first and second cutting tables forwards and backwards between the cutting area and a loading area generally adjacent thereto and a vertical table movement device operative to move the first and second cutting tables upwards and downwards, the vertical and horizontal table movement devices cooperating to move each of the first and second cutting tables from a loading position generally horizontally forwards into the cutting area for cutting of material mounted thereon then generally horizontally backwards into the loading area to a position generally underneath the other of the cutting tables which has been lifted into the elevated loading position, thereby cycling the first and second cutting tables to alternate use of each.

17 Claims, 10 Drawing Sheets

U.S. PATENT DOCUMENTS

| | | | |
|---|---|---|---|
| 6,471,290 | B1 | 10/2002 | Moody et al. |
| 6,664,495 | B2 | 12/2003 | Yamaguchi et al. |
| 6,727,457 | B1 | 4/2004 | Vande Berg |
| 7,011,789 | B1 | 3/2006 | Bowlin et al. |
| 7,560,064 | B1 * | 7/2009 | Crees et al. .................... 266/49 |
| 2004/0202531 | A1 | 10/2004 | Beransky et al. |
| 2005/0140071 | A1 | 6/2005 | Reist et al. |
| 2010/0133730 | A1 * | 6/2010 | Sunderman et al. ............ 266/44 |

OTHER PUBLICATIONS

U.S. Appl. No. 11/389,548, filed Mar. 24, 2006, Sunderman, John R., et al.

Examiner's Non-Final Rejection for USPTO U.S. Appl. No. 11/389,548 of Jun. 18, 2008.

Applicant's Response to Office Action for USPTO U.S. Appl. No. 11/389,548 of Jun. 18, 2008.

Examiner's Final Rejection for USPTO U.S. Appl. No. 11/389,548 mailed Dec. 12, 2008.

Applicant's Response to Final Office Action for USPTO U.S. Appl. No. 11/389,548 of Dec. 12, 2008.

Examiner's Non-Final Rejection for USPTO U.S. Appl. No. 11/166,799 mailed Oct. 16, 2007.

Applicant's Response to Office Action for USPTO U.S. Appl. No. 11/166,799 of Oct. 16, 2007.

Examiner's Non-Final Rejection for USPTO U.S. Appl. No. 11/166,799 mailed Apr. 11, 2008.

Applicant's Response to Office Action for USPTO U.S. Appl. No. 11/166,799 of Apr. 11, 2008.

Examiner's Final Rejection for USPTO U.S. Appl. No. 11/166,799 mailed Oct. 28, 2008.

Applicant's Response to Final Office Action for USPTO U.S. Appl. No. 11/166,799 of Oct. 28, 2008.

Examiner's Advisory Action (PTOL-303) for USPTO U.S. Appl. No. 11/166,799 mailed Jan. 21, 2009.

International Search Report and Written Opinion dated Apr. 7, 2009 filed in PCT/US2009/034215, 7 pages.

* cited by examiner

DOWNDRAFT EXHAUST CUTTING AND SHUTTLE TABLE MECHANISM

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to cutting tables and, more particularly, to a downdraft exhaust cutting and shuttle table mechanism which includes first and second elongated, horizontally disposed cutting tables which are shuttled into and out of a cutting area which includes a material cutting assembly positioned therein, the shuttle table mechanism including horizontal and vertical table movement devices which are operative to move the first and second cutting tables forwards and backwards between the cutting area and a loading area generally adjacent thereto and a vertical table movement device operative to move the first and second cutting tables upwards and downwards, the overall device further including an exhaust duct positioned in the cutting area beneath the first and second cutting tables and a slag collector also positioned beneath the cutting table for collecting slag falling downwards from the first and second cutting tables, the vertical and horizontal table movement devices cooperating to move each of the first and second cutting tables from a loading position while in the loading area then generally horizontally forwards into the cutting area for cutting of material mounted thereon then generally horizontally backwards into the loading area to a position generally underneath the other of the first and second cutting tables which has been lifted into the elevated loading position, thereby cycling the first and second cutting tables to alternate use of each of the cutting tables.

2. Description of related Art

Cutting tables for cutting a work piece such as a metal plate typically include a table surface for supporting the work piece. A cutting torch assembly, which may include a plasma cutting torch, a laser cutting torch, an oxy-fuel cutting torch, or the like, may be suspended above the cutting table for cutting the metal plate. In the majority of instances, the cutting torch is computer-controlled to follow a programmed pattern or template, thus cutting the metal plate in an automated sequence, one which is easily repeatable for cutting of numerous identical pieces from a series of metal plates.

Several different types of cutting table assemblies have been proposed in the prior art, including those shown in U.S. Pat. Nos. 6,039,915, 6,165,410 and 5,435,525, all of which provide various devices for removing undesirable fumes and slag from the vicinity of the cutting table by utilizing one or more exhaust ducts for evacuating the fumes and which further include a slag removal system for removing slag. However, it has been found that due to advances in the cutting systems being currently used in the industry, heavier and thicker pieces of steel may be cut using these new systems, and this results in more smoke, more waste, more light, and more noise being produced than has been produced previously, and the downdraft cutting table assemblies found in the prior art do not provide adequate solutions to the problems encountered during use of these new improved cutting systems.

It has been found that the most significant impediment to use of these improved cutting systems is that the loading and unloading of the heavier and thicker plates and parts has become an ever more difficult and daunting procedure. There is, therefore, a need for an improved downdraft exhaust cutting mechanism which will speed the loading and unloading process, yet which will also allow for the use of the exhaust ducting and slag collection devices which are known and used in the industry in order to provide a safe and efficient yet significantly improved cutting table mechanism.

However, one of the significant problems encountered in the prior art is that the vast majority of shuttle tables currently in use do not provide accommodation for the use of partitioned downdraft exhaust systems or for slag collection devices since the movement of the shuttle cutting tables takes precedence in the design and functional considerations of operation of the device. It has been found that these features are of critical importance in improving the operational efficiency of cutting tables, and therefore it is of critical importance to include these features in a shuttle table.

Therefore, an object of the present invention is to provide an improved downdraft exhaust cutting and shuttle table mechanism which significantly improves the speed and efficiency of cutting table processes.

Another object of the present invention is to provide an improved downdraft exhaust cutting and shuttle table mechanism which includes first and second elongated, horizontally disposed cutting tables which are horizontally and vertically moveable to move the first and second cutting tables from a loading position upwards or downwards while in the loading area, then generally horizontally forwards into a cutting area for cutting of material mounted thereon then generally horizontally backwards into the loading area to a position generally underneath the other of the first and second cutting tables which has been lifted into the elevated loading position.

Yet another object of the present invention is to provide an improved downdraft exhaust cutting and shuttle table mechanism which will effectively double the efficiency of cutting table processes by permitting preparation and loading of one of the cutting tables while the other of the cutting tables is supporting material being cut thereon in the cutting area of the present invention.

Still another object of the present invention is to provide a downdraft exhaust cutting and shuttle table mechanism which continually rotates the cutting tables such that the cutting table having material recently cut thereon is positioned beneath the cutting table having material to be cut mounted thereon in order to prevent material and debris from falling from the cut plate onto the uncut plate thus mandating removal thereof prior to cutting of the uncut material, thus greatly increasing the efficiency of operation of the present invention.

Another object of the present invention is to provide an improved downdraft exhaust cutting and shuttle table mechanism which provides a protective enclosure surrounding the cutting area of the invention to protect the external surroundings from light, heat and debris produced during the cutting process, thus rendering the surrounding facility far safer and more conducive to improved worker health.

Finally, an object of the present invention is to provide a downdraft exhaust cutting and shuttle table mechanism which is relatively straightforward and functional in design and construction and which is safe, effective and efficient in use.

BRIEF SUMMARY OF THE INVENTION

The present invention provides a downdraft exhaust cutting and shuttle table mechanism including a shuttle table mechanism having first and second elongated, horizontally disposed cutting tables having opposite ends and opposite sides, a horizontal table movement device operative to alternatively move each of the first and second cutting tables forwards and backwards in a generally horizontal plane between a cutting area and a loading area generally adjacent to the cutting area and a vertical table movement device in the loading area, the vertical table movement device operative to move the first and second cutting tables upwards and downwards in a generally vertical plane. A material cutting assembly is positioned in the cutting area over the first and second cutting tables, the material cutting assembly being moveable along the length thereof to cut material positioned on the first and second cutting tables upon one of the first and second cutting tables being moved into the cutting area. An exhaust duct is positioned in the cutting area beneath the first and second cutting tables when the cutting tables are positioned in the cutting area, the exhaust duct including an exhausting device for exhausting air from within the exhaust duct. A slag collector is positioned in the cutting area beneath the first and second cutting tables when those cutting tables are positioned in the cutting area for collecting slag which is created by the material being cut which falls downwardly from the first and second cutting tables, the slag collector being selectively moveable along the length of the first and second cutting tables. Finally, the vertical and horizontal table movement devices cooperate to move the first and second cutting tables from a loading position upwards or downwards while in the loading area then generally horizontally forwards into the cutting area for cutting material mounted thereon then generally horizontally backwards into the loading area to a position generally underneath the other of the first and second cutting tables which has been lifted into the elevated loading position such that the first and second cutting tables are cycled to alternatively use each of the cutting tables for cutting of material placed thereon.

The present invention as thus described provides a substantial improvement over those devices found in the prior art. For example, because the present invention includes two cutting tables which cycle with one another to move into and out of the cutting area, the efficiency of the present invention is effectively doubled over those devices and methods found in the prior art. Furthermore, because the first and second cutting tables are cycled in such a manner as to keep the recently cut material positioned underneath the new material to be cut, transfer of waste and debris from the previously cut material to the ready to be cut material is generally prevented, thus ensuring that cutting of the new material will not be degraded through the undesirable presence of debris on the material to be cut. Finally, because the present invention not only includes the shuttle table mechanism which increases the efficiency of operation of the present invention but also includes the exhaust duct and slag collector for removing harmful fumes and collecting waste and debris from underneath the cutting area, the combination of all three elements greatly improves the operating efficiency of the present invention over those devices found in the prior art, and therefore represents a significant improvement over those devices found in the prior art. It is therefore seen that the present invention provides numerous advantages over those devices and methods found in the prior art which are apparent from the present disclosure.

It is to be further understood that both the foregoing general description and the following detailed description are exemplary and explanatory only and are not necessarily restrictive of the invention as claimed. The accompanying drawings, which are incorporated in and constitute a part of the specification, illustrate at least one embodiment of the invention and together with the general description, serve to explain the principles of the invention.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DESCRIPTION OF THE PREFERRED EMBODIMENT

Figure 1:
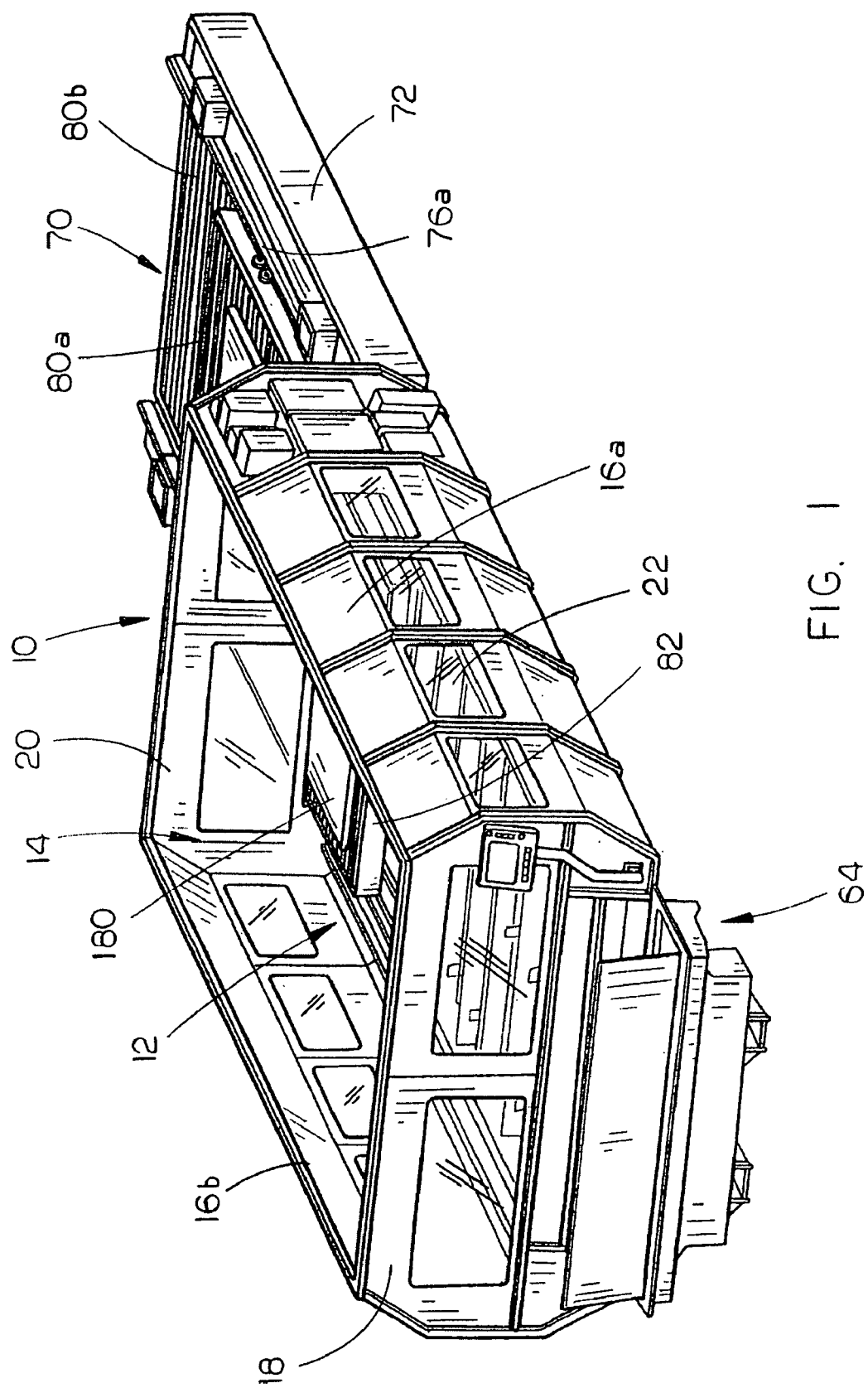
FIG. 1 is a front perspective view of downdraft exhaust cutting and shuttle table mechanism of the present invention.
Figure 2:
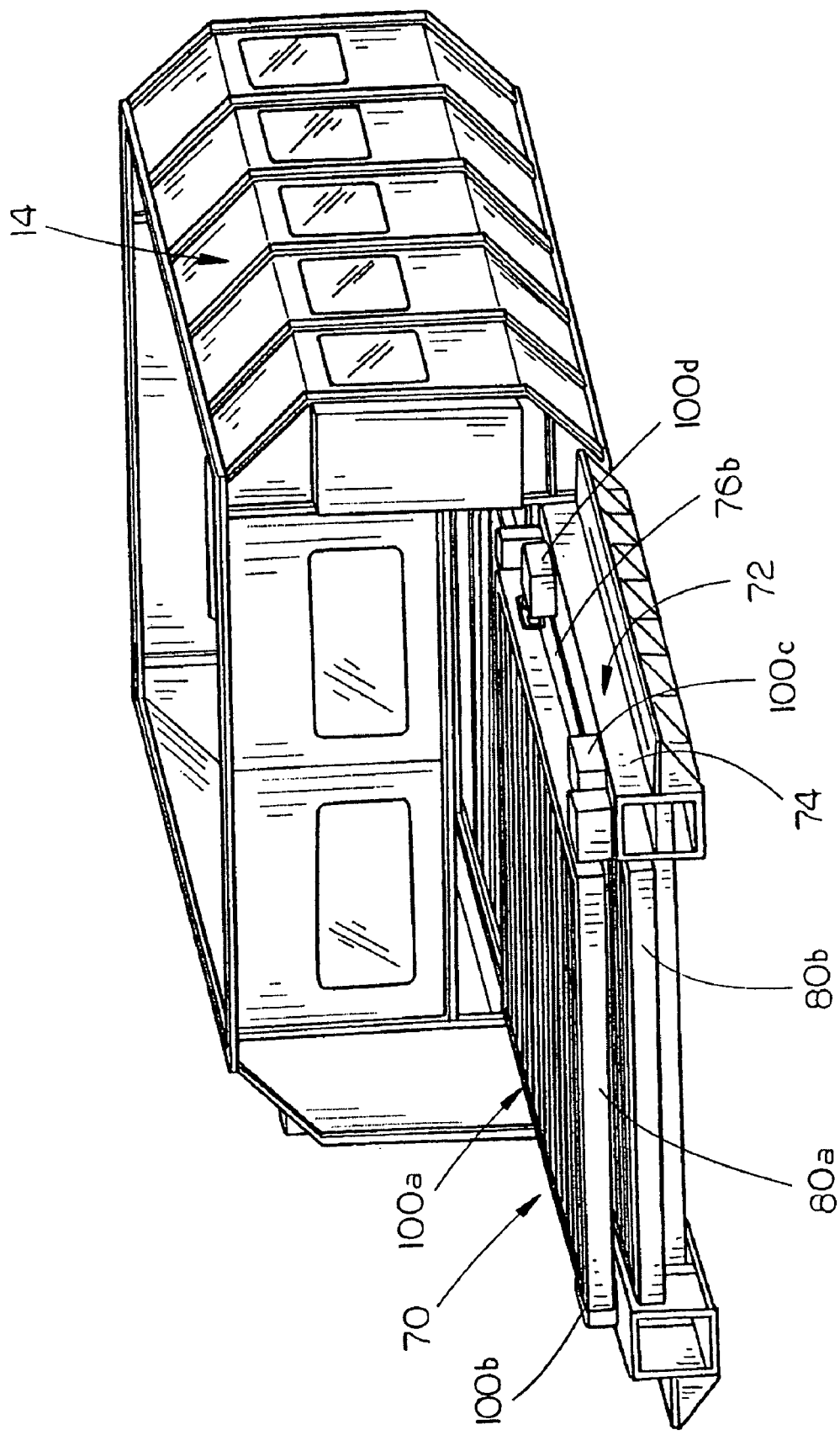
FIG. 2 is a rear perspective view of downdraft exhaust cutting and shuttle table mechanism of the present invention.
Figure 3:
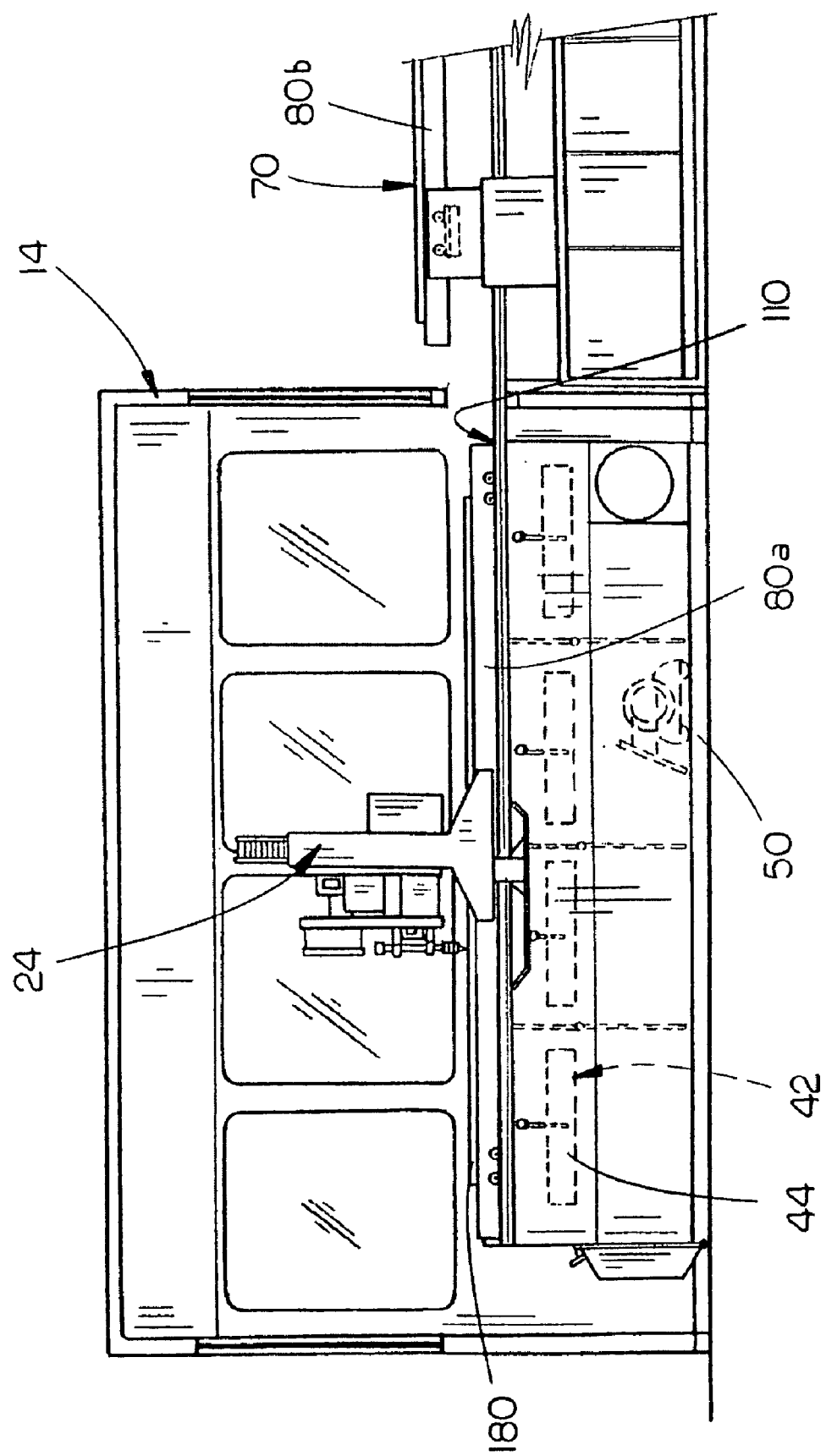
FIG. 3 is a detailed side elevational view of the cutting area of the present invention.
Figure 4:
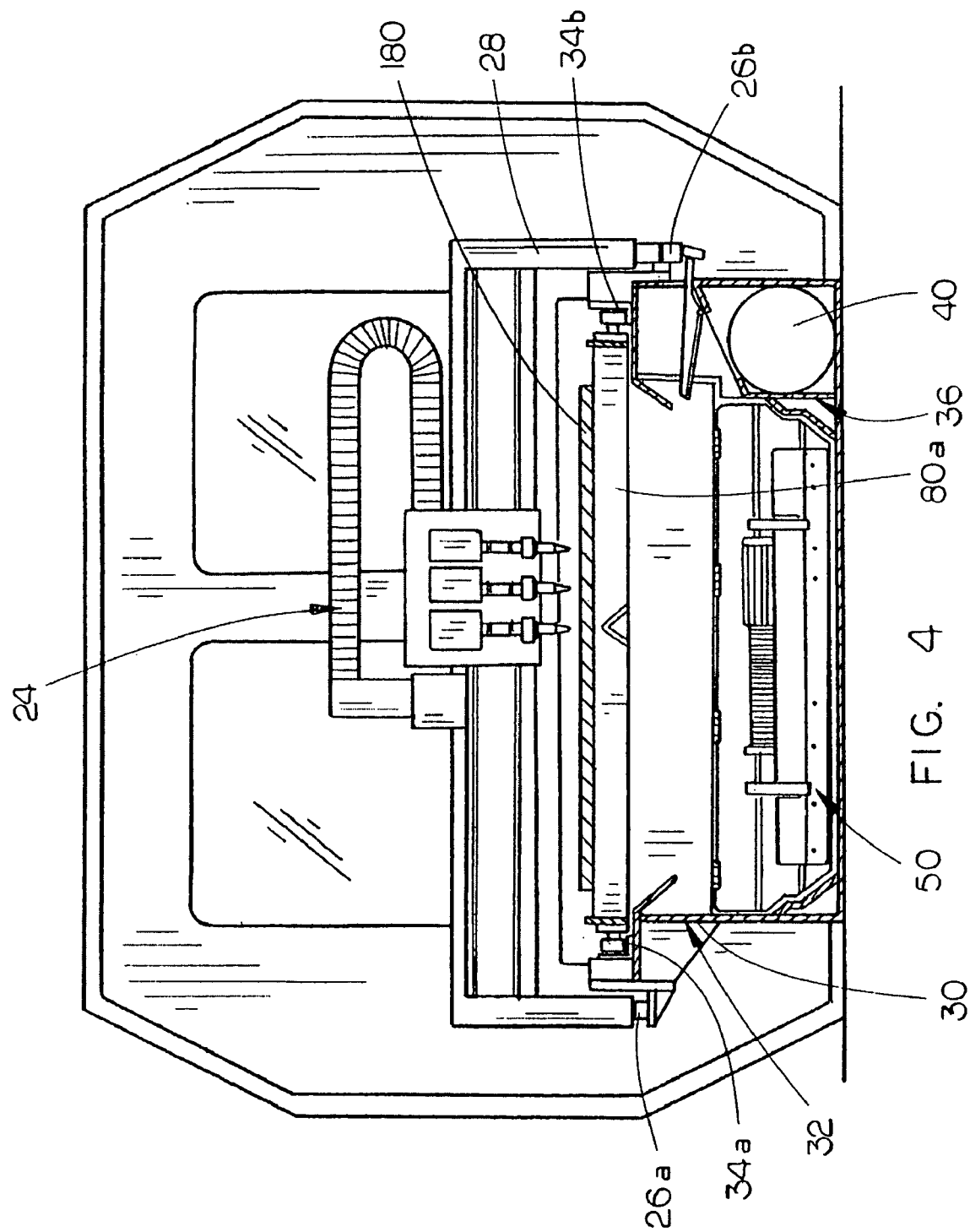
FIG. 4 is a detailed front elevational view of the cutting area of the present invention.
Figure 5:
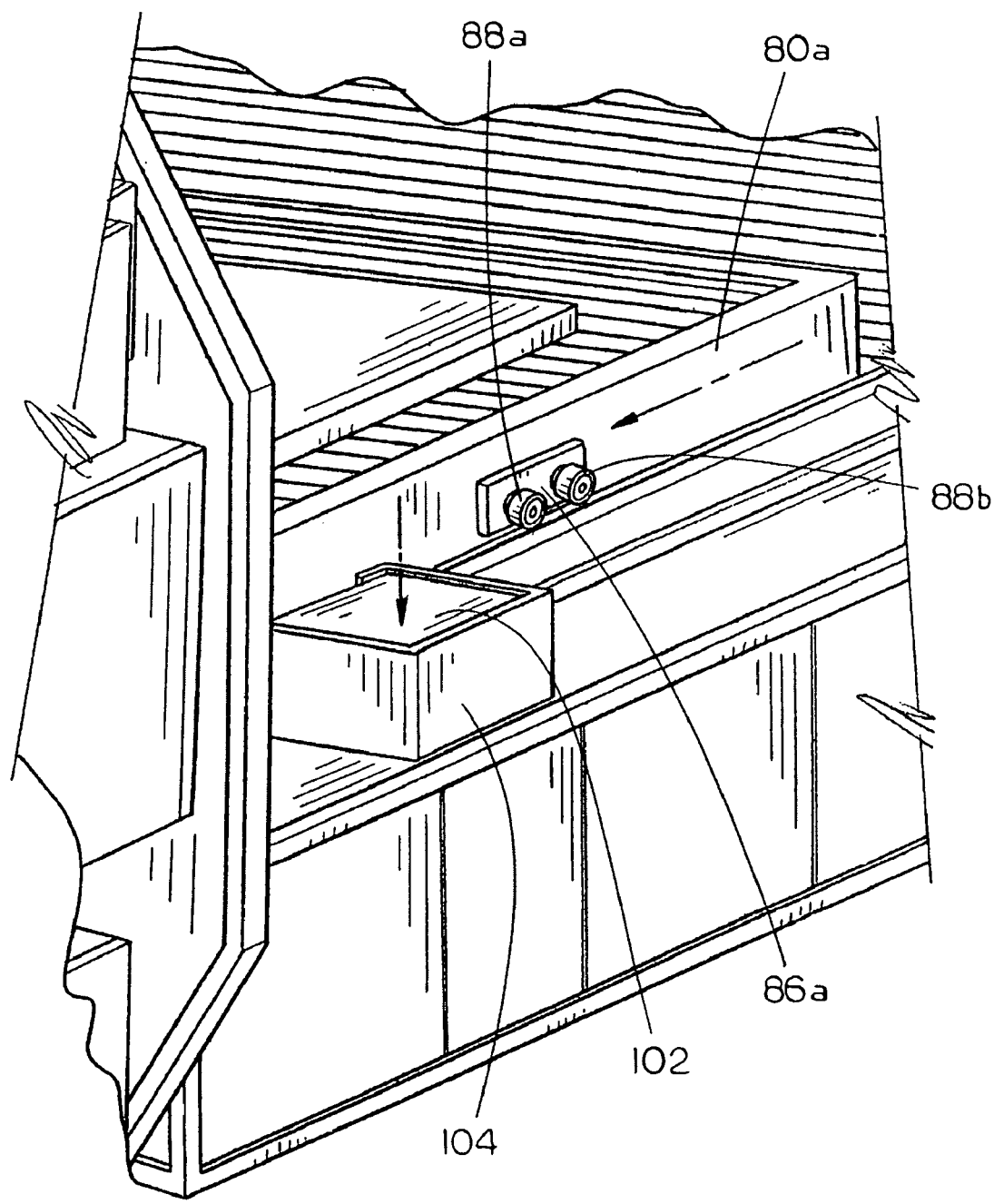
FIGS. 5, 6 and 7 are detailed perspective views of one of the vertical table movement devices of the present invention.

The downdraft exhaust cutting and shuttle table mechanism 10 of the present invention is shown best in FIGS. 1-4 as including two main sections, the first being a cutting area 12 wherein metal material is cut and the second being a loading area 70 which is external of the cutting area yet generally adjacent thereto. In the preferred embodiment, the cutting area 12 would be generally similar to the cutting units described with particularity in connection with U.S. Pat. Nos. 6,039,915 and 6,165,410, the cutting area 12 including a cutting area enclosure 14 having sidewalls 16a and 16b, a front wall 18, rear wall 20 and a plurality of viewing windows 22 formed in each of the sidewalls 16a and 16b, front wall 18 and rear wall 20. Housed within the cutting area enclosure 14 is the material cutting assembly 24 which, in the preferred embodiment, would be of conventional variety such as a plasma cutter, laser cutter or oxy-fuel cutting torch, the material cutting assembly 24 being mounted on rails 26a and 26b to permit the material cutting assembly 24 to be moved over the entire metal piece 180 which is to be cut. It is further preferred that the material cutting assembly 24 also be transversely moveably mounted on a material cutting assembly support frame 28, as shown best in FIG. 4, the material cutting assembly support frame 28 being moveably mounted on the rails 26a and 26b such that the material cutting assembly 24 may be moved into any preferred position above the metal piece 180 to be cut, thus facilitating the cutting of that metal piece 180.

A cutting table support frame 30 is housed within the cutting area enclosure 14, the cutting table support frame 30 including an upper cutting table support section 32 which includes a pair of spaced-apart generally horizontal rails 34*a* and 34*b* which run the length of the cutting table support frame 30, the horizontal rails 34*a* and 34*b* being generally L-shaped in cross-sectional shape, although the particular size and shape of the horizontal rails 34*a* and 34*b* is not particularly critical to the present invention so long as the horizontal rails 34*a* and 34*b* provide a sturdy and stable support structure for the first and second cutting tables 80*a* and 80*b* as will described later in this disclosure. The lower section 36 of the cutting table support frame 30 is shown best in FIGS. 3 and 9 as including two main elements which have been used in connection with previous downdraft exhaust cutting tables, the first being the exhaust duct system 40 and the second being the slag removal device 50. In the preferred embodiment, exhaust duct 40 would be provided with a plurality of spaced-apart openings 42 formed in the sidewalls thereof, with each of the spaced-apart openings 42 being selectively closed by a normally closed damper 44. In operation, the dampers 44 would be opened to permit smoke and fume-laden air to pass into the interior of the duct 40 through the spaced-apart openings 42, and the dampers 44 may be opened by any convenient means such as by cams, cylinders, etc., which only peripherally form a part of this invention and disclosure. The smoke and fume-laden air then would pass through the exhaust duct 40, being drawn therethrough via a blower/filter unit 46 or the like, and then being directed out of the cutting are enclosure 14 as has been taught in prior disclosures.

Figure 9:
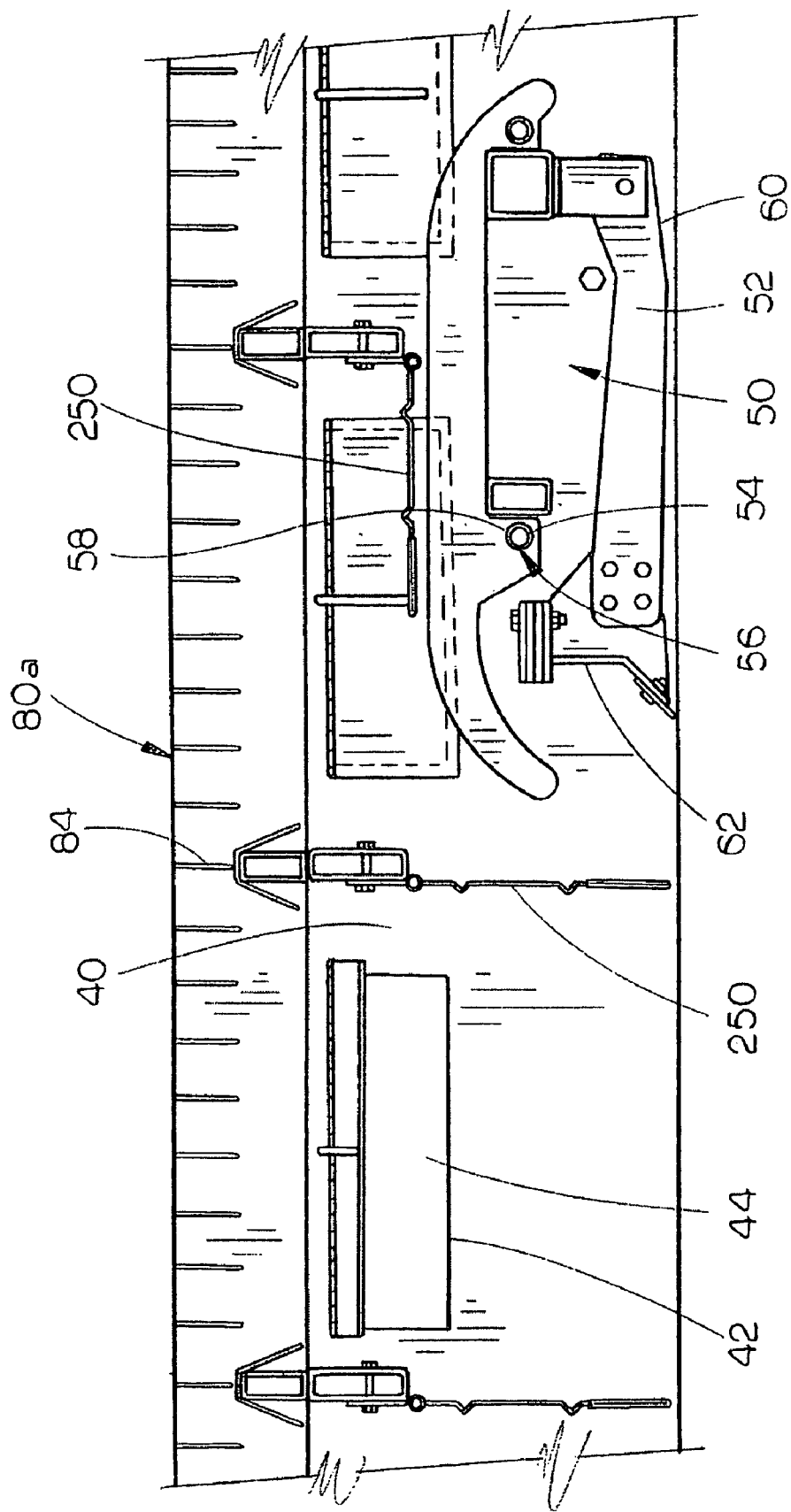

The present invention also includes a plurality of pivotably mounted partition gates 250 which extend outwardly from the sides of the exhaust duct 40 in a spaced-apart relationship. The upper ends of the partition gates 250 are pivotally secured by any convenient means to the upper cutting table support section 32. The partition gates 250 normally hang generally vertically, as illustrated in FIG. 9, but may be pivotally moved to the deflected or open position illustrated in the right portion of FIG. 9. Each of the partition gates 250 extends generally adjacent the floor surface, thus providing a series of partitions which essentially form a series of ventilation zones so that smoke and fume-laden air pulled through the cutting tables may be drawn downwardly between the partition gates 250 and into one of the openings 42. Appropriate means is provided for opening the dampers 44 in response to the position of the cutting torch and the slag removal device. The novel downdraft exhaust cutting table thus creates ventilation zones which are successively opened when the cutting torch assembly is positioned thereabove to ensure that polluted air created by the cutting torch assembly is exhausted downwardly into the exhaust duct 40.

Figure 6:
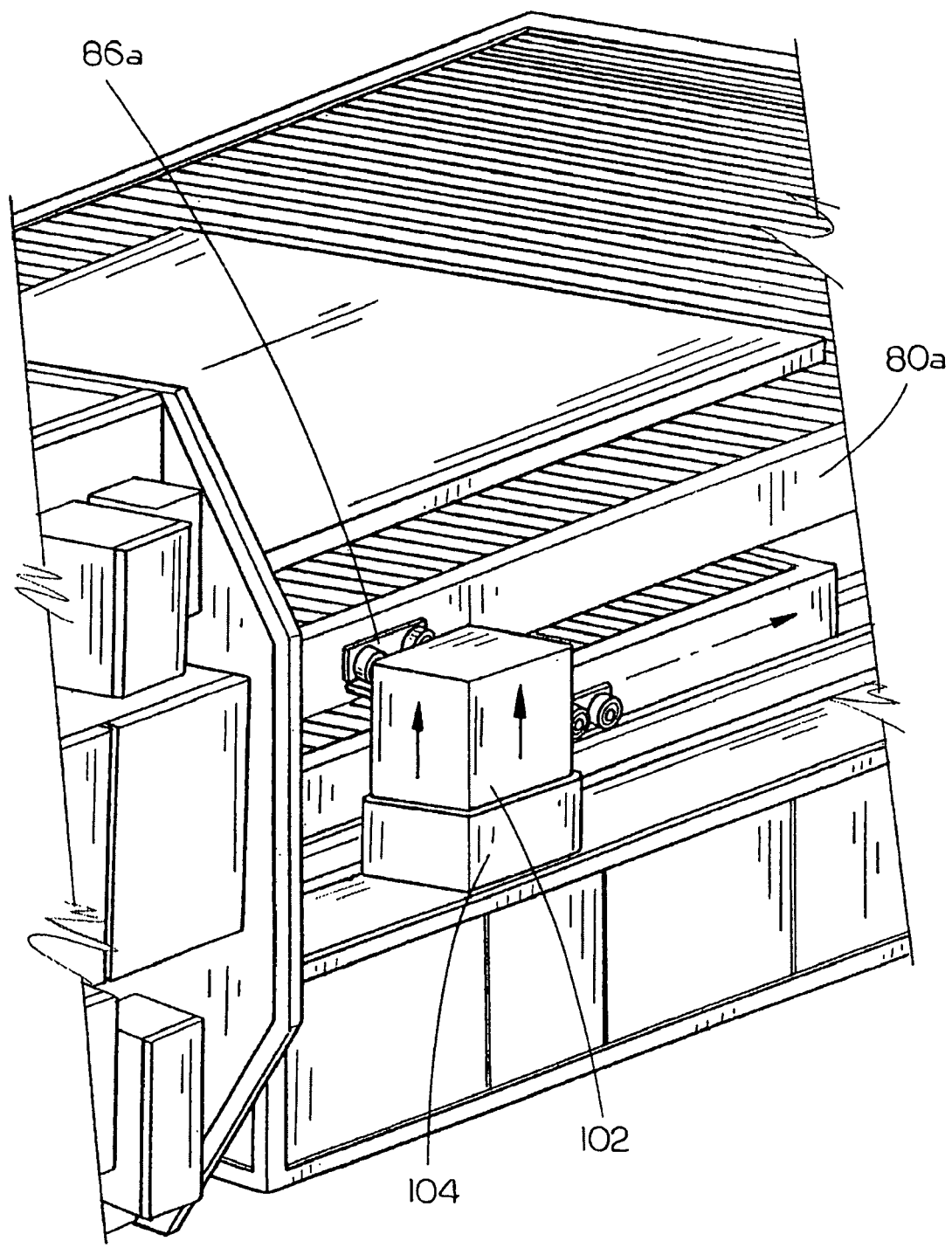
Figure 7:
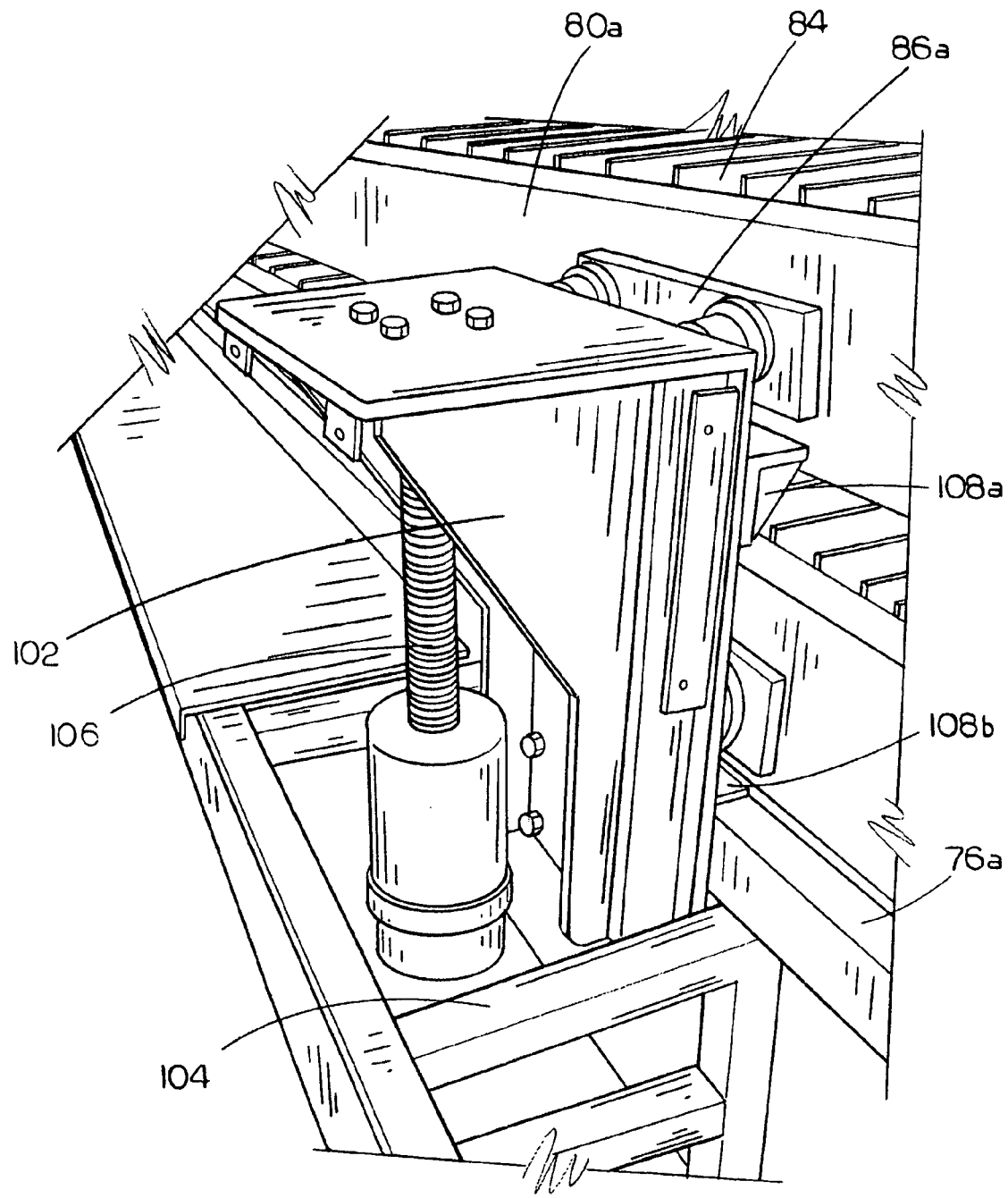
Figure 8:
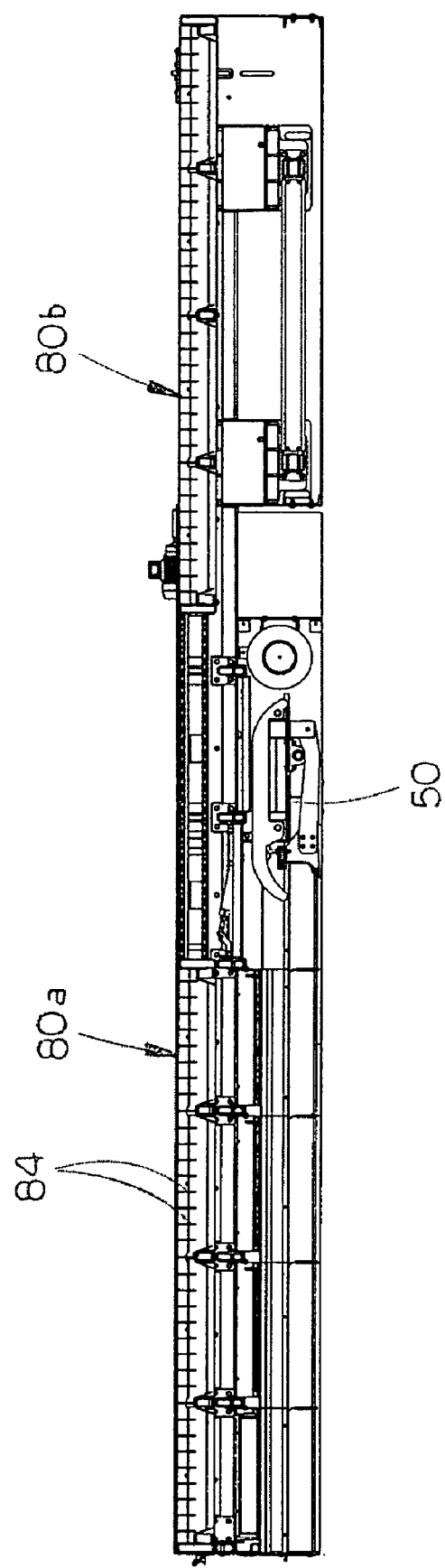
FIGS. 8 and 9 are, respectively, a side elevational view and a detailed side elevational view of the cutting area of the present invention showing the exhaust duct, dampers, partitions and the slag removal device.

The slag removal device 50 is positioned underneath the cutting table support frame 30 and would preferably include a moveably mounted frame 52 which is driven forward and backward underneath the cutting table support frame 30 via a drive motor 54 which drives a shaft 56 having a gear 58 mounted on its outer end which intermeshes with a gear rack 60 positioned on cutting table support frame 30 and running the length thereof. Mounted on the forward part of frame 52 is a slag collection blade 62 which, when driven via drive motor 54, collects and pushes slag falling underneath the cutting table support frame 30 into a slag collection trough 64 positioned at the forward end of cutting area enclosure 14, as shown best in FIG. 1. Alternatively, the slag collection blade 62 may be replaced by a slag collection bucket (not shown) which would be positioned underneath the material cutting assembly 24 at the location where the metal piece 180 is being cut in order to "catch" much of the slag falling downwards through the cutting table support frame 30. In either case, however, it is important to note that the slag removal device 50 functions to quickly and efficiently collect and remove slag from underneath the cutting table support frame 30 which is produced during the cutting process. It should also be noted that the slag removal device 50 is designed to pass under and through the partition gates 250 as shown in FIG. 6, and the operation of the slag removal device 50 in traveling underneath the first and second cutting tables 80*a* and 80*b* when they are positioned in the cutting area 12 and pushing the partition gates 250 out of the way when passing therethrough is clearly shown in FIG. 6.

The important functional features of the present invention, however, will now be described as being focused generally in the loading area 70 of the present invention. Specifically, the loading area includes a shuttle table mechanism 72 which includes a shuttle cutting table support frame 74 having a pair of shuttle cutting table support rails 76*a* and 76*b* which run the length of the shuttle cutting table support frame 74 and are generally colinearly aligned with the horizontal rails 34*a* and 34*b* on cutting table support frame 30, thereby creating a pair of generally continuous rails on which the cutting tables may travel. Moveably mounted on the shuttle cutting table support rail 76*a* and 76*b* are first and second cutting tables 80*a* and 80*b*, each of which are generally identically to one another and would include an external generally rectangular frame 82 and the plurality of cross-brace support struts 84 which extend between opposite sides of the external frame 82 and provide support for metal pieces 180 to be supported thereon. Many different sizes, shapes and styles of cutting tables are currently used in the metal cutting industry, and therefore it is to be understood that numerous modifications to the particular size, shape and configuration of the cutting tables 80*a* and 80*b* are to be incorporated in this invention. However, it is to be noted that each of the cross-brace support struts 84 would preferably be configured to present a minimal top surface area, in the preferred embodiment, the cross-brace support struts 84 would be upright, generally parallel plates as shown in FIG. 9, and the metal piece 180 to be cut would be supported on the top edges of the cross-brace support struts 84. This allows the first and second cutting tables 80*a* and 80*b* to not only support the metal to be cut, but due to the spacing of the cross-brace support struts 84 and the air gaps therebetween, the downdraft function of the present invention is enabled as air may be drawn through the first and second cutting tables 80*a* and 80*b* when they are in the cutting area 12, down into the exhaust duct 40, and out through the exhaust duct 40. It is to be further noted that because each of the first and second cutting tables 80*a* and 80*b* are generally identical to one another, the following description of the elements of the first cutting table 80*a* should be understood to apply equally to the second cutting table 80*b*.

Mounted on and extending outwards from external frame 82 are a plurality of wheeled frame supports 86*a*, 86*b*, 86*c*, and 86*d* each of which would preferably include a pair of rollably mounted wheels 88*a* and 88*b* which engage the shuttle cutting table support rails 76*a* and 76*b*, and it is via the wheeled frame supports 86*a*-*d* that the first and second cutting table 80*a* and 80*b* are able to roll on the shuttle cutting table support rails 76*a* and 76*b* and in turn, the horizontal rails 34*a* and 34*b* on cutting table support frame 30 in the cutting area 12.

For lifting and lowering the first and second cutting tables 80a and 80b, four synchronized independent lift stations 100a, 100b, 100c and 100d are positioned generally adjacent to the four corners of the shuttle cutting table support frame 74, as shown best in FIGS. 2, 5-7 and 6-8. In the preferred embodiment, each of the independent lift stations 100a-d would be generally identical to one another, and therefore the description of independent lift station 100a should be understood to apply equally to the remaining independent lift stations 100b, 100c and 100d. Independent lift station 100a preferably would be constructed as a pneumatic, hydraulic or mechanical lifting station which includes a central lift pillar 102 which is vertically moveably mounted within lift station frame 104. The central lift pillar 102 is moved up and down via the aforementioned pneumatic, hydraulic or mechanical lifting mechanism 106, control of which would generally be performed by a computerized control system 110 which independently controls each of the independent lift stations 100a-d yet which also synchronizes the lifting of those central lift pillars 102 of each of the independent lift stations 100a-d to lift and support each of the first and second cutting tables 80a and 80b.

Mounted on the inner wall of the central lift pillar 102 are two wheeled frame support engagement rails 108a and 108b which are vertically spaced from one another along the inner side of central lift pillar 102 and which have a cross-sectional shape generally similar to the cross-sectional shape of shuttle cutting table support rails 76a and 76b. In fact, the wheeled frame support engagement rails 108a and 108b on the central lift pillar 102 are aligned with the adjacent shuttle cutting table support rail 76a when the central lift pillar 102 is in certain extended lift positions such that the wheeled frame support engagement rails 108a and 108b are aligned with and complete the shuttle cutting table support rail 76a such that the wheeled frame support engagement rails 108a and 108b align with and complete the shuttle cutting table support rail 76a so that the first and second cutting tables 80a and 80b may roll along the shuttle cutting table support rails 76a and 76b in a generally continuous manner. The true intended function of the wheeled frame support engagement rails 108a and 108b is best shown in FIGS. 10-14, however, in that the first and second cutting tables 80a and 80b, when positioned in the loading area 70 on shuttle table mechanism 72, have their attached wheeled frame supports 86a-d supported on the wheeled frame support engagement rails 108a or 108b, depending on the height at which the central lift pillar 102 of independent lift station 100a is positioned. This permits the sequence shown in FIGS. 6-8 to be accomplished, specifically that when the first cutting table 80a is ready for use with a metal piece 180 to be cut being placed thereon, the independent lift stations 100a-d are positioned such that the supporting wheeled frame support engagement rail 100a is aligned with the shuttle cutting table support rail 76a and 76b. This permits the first cutting table 80a to be rolled forwards into the cutting area 12 of the downdraft exhaust cutting and shuttle table mechanism 10 via the horizontal table movement device 120, which, in the preferred embodiment, would be a motor connected to one of the wheels 88a and 88b on wheeled frame support 86a or another such appropriate horizontal table movement device which shuttles the first and second cutting tables 80a and 80b between the loading area 70 and cutting area 12.

Once the first cutting table 80a is positioned in the cutting area 12, a retractable locking arm 110 mounted on the cutting table support frame 30 is moved into contact with the first cutting table 80a to fulfill two main purposes, one, to releasably lock the first cutting table 80a on the cutting table support frame 30 to prevent movement thereof during the cutting process, and two, to ground the first cutting table 80a so that proper cutting via the material cutting assembly 24 may be performed. The retractable locking arm 110 maintains a highly accurate horizontal placement of the table in respect to the cutting apparatus and may eliminate the requirement for "homing" or separate positioning steps by the cutting device.

Figure 10:
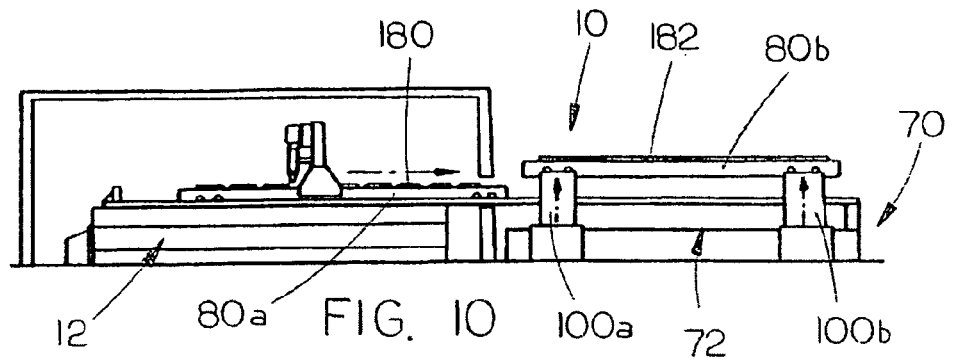
FIGS. 10, 11, 12, 13 and 14 are side elevational views of the present invention showing the cycling process which cycles the first and second cutting tables between the loading and cutting areas of the present invention.
Figure 11:
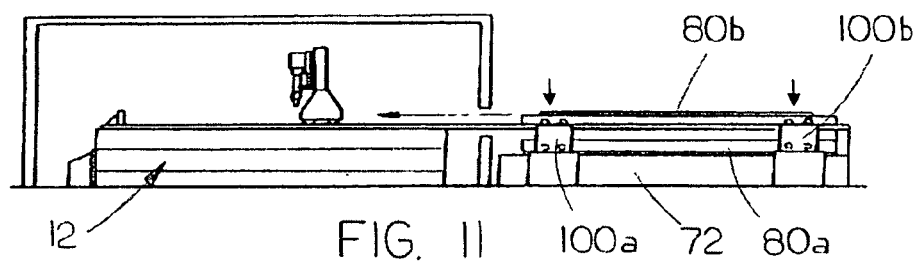

The cutting process then can begin, with the accompanying use of exhaust duct.40 and slag removal device 50 as has been disclosed previously. FIGS. 10-14 best illustrate the transfer sequence of the first and second cutting tables 80a and 80b in that simultaneous with the cutting of the metal piece 180 on first cutting table 80a, second cutting table 80b, supported on another of the wheeled frame support engagement rails 108b, is positioned via independent lift stations 100a-d to have another metal piece 182 placed thereon for a new cutting sequence to begin and then is raised upwards via independent lift stations 100a-d until the wheeled frame support engagement rail 108b is aligned with the shuttle cutting table support rail 76a and 76b. The first cutting table 80a is then moved back from the cutting area 12 to the loading area 70, as shown in FIG. 10, the first cutting table 80a being moved into the loading area 70 over the shuttle cutting table support rail 76a and 76b until the wheeled frame support 86a-d rests on the wheeled frame support engagement rails 108b of independent lift stations 100a-d. At this point, the first cutting table 80a, having the metal piece 180 which was cut still mounted thereon, is positioned beneath the second cutting table 80b thus preventing debris from falling off of the first cutting table 80a onto the second cutting table 80b since it is positioned above the first cutting table 80a. The independent lifting stations 100a-d would then be lowered to align the wheeled frame support engagement rails 108a on which second cutting table 80b is resting with the shuttle cutting table support rail 76a and 76b, as shown in FIG. 11, and at this point second cutting table 80b may be moved from the loading area 70 to cutting area 12 via horizontal table movement device 120.

Figure 12:
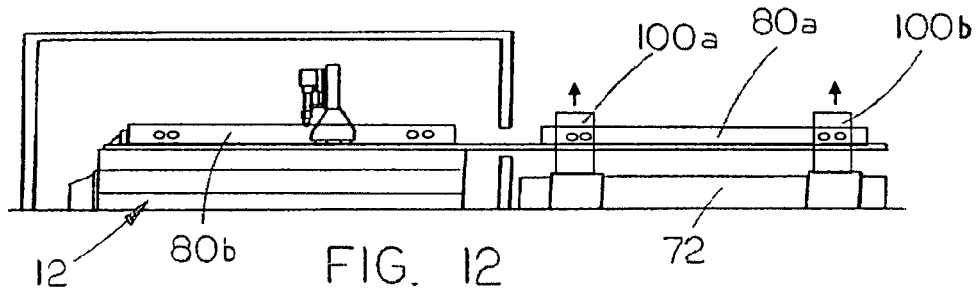
Figure 13:
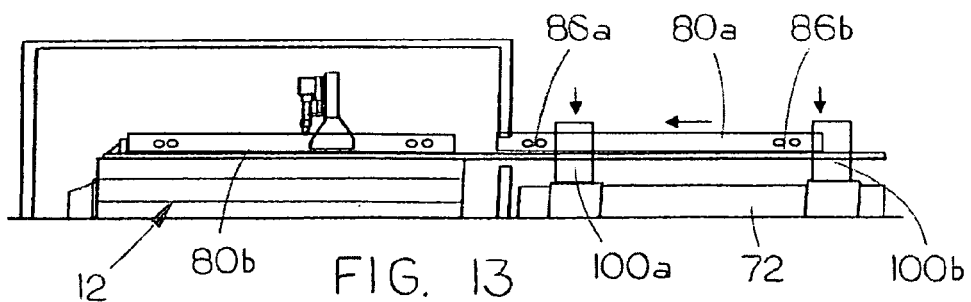
Figure 14:
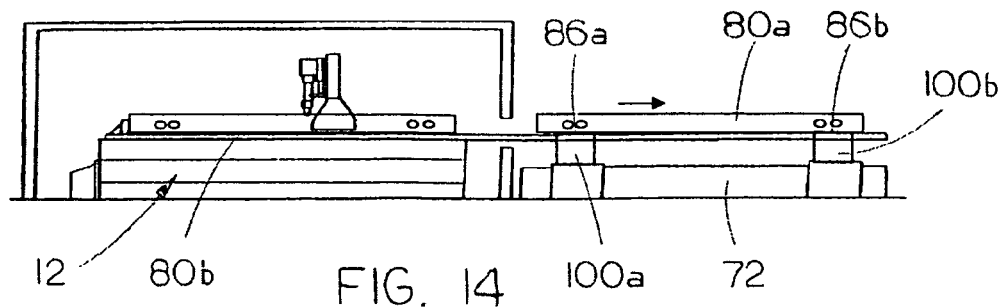

As shown in FIG. 12, the independent lifting stations 100a-d would then be raised to align the wheeled frame support engagement rails 108b on which first cutting table 80a is resting with the shuttle cutting table support rail 76a and 76b, and the first cutting table 80a is rolled forwards or rearwards as shown in FIG. 13 to move the first cutting table 80a off of the wheeled frame support engagement rails 108b. The independent lifting stations 100a-d would then be lowered to align the wheeled frame support engagement rails 108a with the shuttle cutting table support rails 76a and 76b. The first cutting table 80a would then be moved back onto the wheeled frame support engagement rails 108a, as shown in FIG. 14, and the first cutting table 80a may then be lifted above the returning second cutting table 80b, and the entire process then continues with the first and second cutting tables 80a and 80b being cycled to keep the clean cutting surface above the already dirty cutting surface at all times.

Of course, it is to be noted that numerous additions, modifications and substitutions may be made to the downdraft exhaust cutting and shuttle table mechanism 10 of the present invention which fall within the intended broad scope of the appended claims. For example, the precise size, shape and construction materials used in connection with the present invention may be modified or changed so long as the intended functional features of the invention are neither significantly degraded nor destroyed. Furthermore, the precise nature of the independent lift stations 100a-d may be modified or changed so long as the intended function of lifting, supporting and cycling the first and second cutting tables 80a and 80b is generally maintained. Also, it should be noted that although the present invention has been described as being used in connection with two cutting tables, it is a relatively simple matter to provide three or even four cutting tables for use with the system of the present invention, with the only significant modification being to increase the number of wheeled frame support engagement rails 108a and 108b mounted on the inner wall of central lift pillar 102 of independent lift stations 100a-d. Also, the present invention further contemplates that the shuttle cutting table support rail 76a and 76b of the device can be extended to facilitate the transfer of the cutting tables to another production process and/or material handling step, which may be deemed beneficial in some situations. Finally, it should be noted that although the present invention has been described as including various features which were disclosed in previously issued patents, it is believed that the use of those features in connection with the shuttle table mechanism 72 of the present invention will greatly enhance and improve efficiency of the present invention.

There has, therefore, been shown and described a downdraft exhaust cutting and shuttle table mechanism 10 which accomplishes at least all of its intended objectives.

We claim:

1. A downdraft exhaust cutting and shuttle table mechanism comprising:

a shuttle table mechanism including first and second elongated, horizontally disposed cutting tables having opposite ends and opposite sides, each of said first and second cutting tables including a plurality of cross-brace support struts extending generally transversely on said first and second cutting tables, each of said plurality of cross brace support struts being an upright plate extending generally parallel with one another such that material to be cut is supported on at least some of the top edges of said plurality of cross-brace support struts;

a horizontal table movement device operative to move each of said first and second cutting tables forwards and backwards in a generally horizontal plane between a cutting area and a loading area generally adjacent said cutting area;

a vertical table movement device in said loading area, said vertical table movement device operative to move said first and second cutting tables upwards and downwards in a generally vertical plane;

a material cutting assembly positioned in said cutting area over said first and second cutting tables and being movable along the lengths thereof to cut material positioned on said first and second cutting tables upon one of said first and second cutting tables being moved into said cutting area;

an exhaust duct positioned in said cutting area beneath said first and second cutting tables when one of said first and second cutting tables are positioned in said cutting area;

said exhaust duct having a plurality of horizontally spaced-apart exhaust openings formed therein;

means for exhausting air from within said exhaust duct;

a plurality of vertically disposed and horizontally spaced partition gates extending laterally from said exhaust duct to one side of said cutting area beneath said first and second cutting tables when one of said first and second cutting tables are positioned in said cutting area to define a plurality of ventilation zones;

a slag collecting device positioned in said cutting area beneath said first and second cutting tables when one of said first and second cutting tables are positioned in said cutting area for collecting slag which is created by the material being cut and which falls downwardly from said first and second cutting tables, said slag collecting device being selectively movable along the length of said first and second cutting tables; and said vertical table movement device and said horizontal table movement device cooperating to vertically move one of said first and second cutting tables from a loading position while in said loading area then generally horizontally forwards into said cutting area for cutting of material mounted thereon then generally horizontally backwards into said loading area to a position generally underneath the other of said first and second cutting tables which has been lifted via said vertical table movement device.

2. The downdraft exhaust cutting and shuttle table mechanism of claim 1 wherein said slag collecting device comprises a push blade assembly for pushing the slag towards one end of the cutting table.

3. The downdraft exhaust cutting and shuttle table mechanism of claim 2 wherein each of said partition gates has an upper end and a lower end, each of said partition gates being pivotally mounted at its upper end whereby said partition gate may pivotally move about its upper end to permit said push blade assembly to pass therethrough.

4. The downdraft exhaust cutting and shuttle table mechanism of claim 1 wherein said loading area further comprises a pair of shuttle cutting table support rails extending generally parallel with one another for movably supporting said first and second cutting tables thereon.

5. The downdraft exhaust cutting and shuttle table mechanism of claim 4 wherein said vertical table movement device comprises a central lift pillar which is vertically moveably mounted within a lift station frame, one of a pneumatic, hydraulic and mechanical lifting mechanism operatively connected to said central lift pillar for vertical movement thereof, and at least two wheeled frame support engagement rails mounted on said central lift pillar and are vertically spaced from one another along the inner side of central lift pillar, said at least two wheeled frame support engagement rails operative to engage and support said first and second cutting tables for lifting and lowering thereof.

6. The downdraft exhaust cutting and shuttle table mechanism of claim 5 wherein said pair of shuttle cutting table support rails each include gaps into which each of said at least two wheeled frame support engagement rails fit to generally complete at least one of said pair of shuttle cutting table support rails when each of said at least two wheeled frame support engagement rails are collinearly aligned with one of said pair of shuttle cutting table support rails.

7. A downdraft exhaust cutting and shuttle table mechanism comprising:

first and second cutting tables that are each operable to support material to be cut;

a horizontal table movement device that is operable to move each of said first and second cutting tables in a generally horizontal direction between a cutting area and a loading area;

a vertical table movement device that is positioned in said loading area, wherein said vertical table movement device is operable to move each of said first and second cutting tables in a generally vertical direction, wherein said vertical and horizontal table movement devices cooperate to vertically move one of said first and second cutting tables from a loading position while in said loading area then generally horizontally forwards into said cutting area for cutting of material mounted thereon then generally horizontally backwards into said loading area to a position that is vertically spaced from the other of said first and second cutting tables;

an exhaust duct that is positioned in said cutting area, wherein said exhaust duct comprises at least one exhaust opening; and a plurality of horizontally spaced partition gates that are positioned in said cutting area, each of said gates extending laterally from said exhaust duct to define a plurality of ventilation zones.

8. The mechanism of claim 7, further comprising a slag collecting device that is positioned in said cutting area, wherein said slag collecting device is operable to move and collect slag from material being cut.

9. The mechanism of claim 8, wherein each of said partition gates comprises an upper end and a lower end, and wherein each of said partition gates is pivotably mounted at its upper end to permit said slag collecting device to pass therethrough.

10. The mechanism of claim 7, wherein said loading area further comprises a pair of generally parallel shuttle cutting table support rails that are operable to support each of said first and second cutting tables.

11. The mechanism of claim 10, wherein said vertical table movement device comprises a vertically moveable lift pillar and at least two wheeled frame support engagement rails mounted on said lift pillar, wherein each of said wheeled frame support engagement rails is operable to engage and support each of said first and second cutting tables.

12. The mechanism of claim 11, wherein at least one of said shuttle cutting table support rails includes a gap that is operable to receive each of said wheeled frame support engagement rails.

13. The mechanism of claim 11, wherein said vertical table movement device comprises a plurality of vertically moveable lift pillars and wheeled frame support engagement rails mounted on said lift pillars.

14. The mechanism of claim 7, wherein when one of said first and second cutting tables is moved generally horizontally backwards into said loading area it is moved to a position that is generally underneath the other of said first and second cutting tables which has been lifted via said vertical table movement device.

15. The mechanism of claim 7, further comprising a material cutting assembly positioned in said cutting area over said first and second cutting tables when they are positioned in said cutting area, wherein said material cutting assembly is operable to move and cut material positioned on said first and second cutting tables.

16. The mechanism of claim 7, wherein each of said first and second cutting tables comprises a plurality of generally parallel cross-brace support struts each comprising an upright plate with a top edge that is operable to support material to be cut.

17. The mechanism of claim 7, wherein said exhaust duct and partition gates are positioned underneath said first and second cutting tables when said cutting tables are positioned in said cutting area.

\* \* \* \* \*